United States Patent
Toyoda et al.

(10) Patent No.: US 10,023,671 B2
(45) Date of Patent: Jul. 17, 2018

(54) PERFLUOROELASTOMER, PERFLUOROELASTOMER COMPOSITION, CROSSLINKED RUBBER PRODUCT, AND METHOD FOR MANUFACTURING PERFLUOROELASTOMER

(71) Applicant: Asahi Glass Company, Limited, Chiyoda-ku (JP)

(72) Inventors: Mizuna Toyoda, Chiyoda-ku (JP); Hiroki Nagai, Chiyoda-ku (JP); Akira Onodera, Chiyoda-ku (JP); Takeshi Yamada, Chiyoda-ku (JP); Yukiko Hattori, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days.

(21) Appl. No.: 15/084,719

(22) Filed: Mar. 30, 2016

(65) Prior Publication Data

US 2016/0208033 A1    Jul. 21, 2016

Related U.S. Application Data

(63) Continuation of application No. PCT/JP2014/080680, filed on Nov. 19, 2014.

(30) Foreign Application Priority Data

Nov. 26, 2013    (JP) ................. 2013-243731

(51) Int. Cl.
  *C08F 216/00*    (2006.01)
  *C08F 216/14*    (2006.01)
  *C08F 214/26*    (2006.01)

(52) U.S. Cl.
  CPC .... *C08F 216/1408* (2013.01); *C08F 214/262* (2013.01)

(58) Field of Classification Search
  None
  See application file for complete search history.

(56) References Cited

U.S. PATENT DOCUMENTS

| | | | |
|---|---|---|---|
| 4,920,170 A | 4/1990 | Abe et al. | |
| 6,774,196 B1 | 8/2004 | Taira et al. | |
| 7,429,631 B2 * | 9/2008 | Funaki | C08F 214/18 525/326.2 |
| 2002/0198345 A1 * | 12/2002 | Grootaert | C08F 14/26 526/247 |
| 2006/0025528 A1 | 2/2006 | Apostolo et al. | |
| 2006/0025529 A1 | 2/2006 | Apostolo et al. | |
| 2009/0005511 A1 | 1/2009 | Albano et al. | |
| 2009/0030153 A1 | 1/2009 | Stanga et al. | |
| 2009/0264684 A1 | 10/2009 | Apostolo et al. | |
| 2011/0034639 A1 | 2/2011 | Sano | |
| 2012/0226077 A1 | 9/2012 | Apostolo et al. | |

FOREIGN PATENT DOCUMENTS

| | | |
|---|---|---|
| EP | 1 308 467 | 10/2002 |
| JP | 53-4115 | 2/1978 |
| JP | 64-22908 | 1/1989 |
| JP | 2001-151825 | 6/2001 |
| JP | 2004-527596 | 9/2004 |
| JP | 2006-45566 | 2/2006 |
| JP | 2006-52399 | 2/2006 |
| JP | 2007-99624 | 4/2007 |
| JP | 2009-524716 | 7/2009 |
| JP | 2009-524717 | 7/2009 |
| JP | 2009-256418 | 11/2009 |
| JP | 4640021 | 3/2011 |

OTHER PUBLICATIONS

English Translation of International Search Report dated Feb. 24, 2015 in PCT/JP2014/080680, filed Nov. 19, 2014.
Supplementary European Search Report dated Jun. 23, 2017 in connection with corresponding European Patent Application No. 14 86 5582, filed Nov. 19, 2014.

* cited by examiner

*Primary Examiner* — Robert C Boyle
(74) *Attorney, Agent, or Firm* — Oblon, McClelland, Maier & Neustadt, L.L.P.

(57) ABSTRACT

To provide a perfluoroelastomer, which is excellent in low temperature properties, which does not lose value as a rubber and which is free from a decrease of the productivity, a perfluoroelastomer composition, a crosslinked rubber product, and a method for producing a perfluoroelastomer. A perfluoroelastomer comprising structural units (a) derived from tetrafluoroethylene, structural units (b) derived from a perfluoroalkyl vinyl ether represented by the formula (1) (such as perfluoromethyl vinyl ether) and structural units (c) derived from a perfluorooxaalkyl vinyl ether represented by the formula (2) (such as $CF_2=CFOCF_2CF_2OCF_2CF_2OCF_2CF_3$).

23 Claims, No Drawings

PERFLUOROELASTOMER, PERFLUOROELASTOMER COMPOSITION, CROSSLINKED RUBBER PRODUCT, AND METHOD FOR MANUFACTURING PERFLUOROELASTOMER

TECHNICAL FIELD

The present invention relates to a perfluoroelastomer, a perfluoroelastomer composition, a crosslinked rubber product, and a method for producing a perfluoroelastomer.

BACKGROUND ART

A fluororubber is excellent in heat resistance, chemical resistance, oil resistance, weather resistance, etc. and is used for application in a severe environment in which a general purpose rubber cannot be used.

As a known fluororubber, a vinylidene fluoride/hexafluoropropylene copolymer, a tetrafluoroethylene/propylene copolymer or a tetrafluoroethylene/perfluoro(alkyl vinyl ether) copolymer may, for example, be mentioned. Among them, a tetrafluoroethylene/perfluoro(alkyl vinyl ether) copolymer is also called a perfluoroelastomer and is excellent in heat resistance and chemical resistance.

As a known perfluoroelastomer, for example, Patent Document 1 discloses a copolymer of tetrafluoroethylene (hereinafter referred to as "TFE") and perfluoro(methyl vinyl ether) (hereinafter referred to as "PMVE").

Further, Patent Document 2 discloses a copolymer of TFE, PMVE and perfluoro(propyl vinyl ether) (hereinafter referred to as "PPVE").

PRIOR ART DOCUMENTS

Patent Documents

Patent Document 1: JP-B-53-4115
Patent Document 1: Japanese Patent No. 4,640,021

DISCLOSURE OF INVENTION

Technical Problem

The perfluoroelastomers disclosed in Patent Documents 1 and 2 are insufficient in rubber properties at low temperature. In order to solve this problem, for example, a method of increasing the content of a monomer other than TFE may be mentioned.

However, if the content of a monomer other than TFE is increased, other properties such as tensile strength and elongation at break will be significantly lowered, and such a perfluoroelastomer no longer has value as a rubber. Further, in production, the polymerization rate tends to be low, and the productivity will be lowered.

Under these circumstances, the object of the present invention is to provide a perfluoroelastomer which is excellent in low temperature properties, which does not lose value as a rubber, and which is free from a decrease of productivity, a perfluoroelastomer composition, a crosslinked rubber product, and a method for producing a perfluoroelastomer.

Solution to Problem

The present invention provides a perfluoroelastomer, a perfluoroelastomer composition, a crosslinked rubber product, and a method for producing a perfluoroelastomer, of the following [1] to [10].

[1] A perfluoroelastomer comprising structural units (a) derived from tetrafluoroethylene, structural units (b) derived from a perfluoroalkyl vinyl ether represented by the following formula (1) and structural units (c) derived from a perfluorooxaalkyl vinyl ether represented by the following formula (2):

$$CF_2=CFOR^{f1} \quad (1)$$

wherein $R^{f1}$ is a $C_{1-10}$ linear or branched perfluoroalkyl group;

$$CF_2=CF(OCF_2CF_2)_n-(OCF_2)_m-OR^{f2} \quad (2)$$

wherein $R^{f2}$ is a $C_{1-4}$ linear or branched perfluoroalkyl group, n is an integer of from 0 to 3, m is an integer of from 0 to 4, and (n+m) is an integer of from 1 to 7.

[2] The perfluoroelastomer according to [1], wherein the content of the structural units (a) is from 40 to 70 mol %, the content of the structural units (b) is from 3 to 57 mol %, and the content of the structural units (c) is from 3 to 57 mol % based on the total number of moles of the structural units (a), (b) and (c).

[3] The perfluoroelastomer according to [1] or [2], wherein in the formula (2), $R^{f2}$ is a $C_{1-3}$ linear or branched perfluoroalkyl group, and m=3 or 4 when n=0, m=2 to 4 when n=1, and m=0 when n=2 or 3.

[4] The perfluoroelastomer according to any one of [1] to [3], wherein the perfluorooxaalkyl vinyl ether represented by the formula (2) is at least one member selected from the group consisting of $CF_2=CFOCF_2CF_2OCF_2OCF_2OCF_2OCF_2OCF_3$, $CF_2=CFOCF_2CF_2OCF_2OCF_2OCF_3$ and $CF_2=CFOCF_2CF_2OCF_2CF_2OCF_2CF_3$.

[5] A perfluoroelastomer composition comprising the perfluoroelastomer as defined in any one of [1] to [4] and a crosslinking agent.

[6] A crosslinked rubber product obtained by crosslinking the perfluoroelastomer as defined in any one of [1] to [4] or the perfluoroelastomer composition as defined in [5].

[7] A method for producing a perfluoroelastomer, which comprises a step of radical copolymerizing tetrafluoroethylene, a perfluoroalkyl vinyl ether represented by the following formula (1) and a perfluorooxaalkyl vinyl ether represented by the following formula (2) as materials in the presence of a radical polymerization initiator:

$$CF_2=CFOR^{f1} \quad (1)$$

wherein $R^{f1}$ is a $C_{1-10}$ linear or branched perfluoroalkyl group;

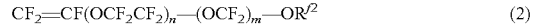

$$CF_2=CF(OCF_2CF_2)_n-(OCF_2)_m-OR^{f2} \quad (2)$$

wherein $R^{f2}$ is a $C_{1-4}$ linear or branched perfluoroalkyl group, n is an integer of from 0 to 3, m is an integer of from 0 to 4, and (n+m) is an integer of from 1 to 7.

[8] The method for producing a perfluoroelastomer according to [7], wherein the radical copolymerization is carried out in the presence of a chain transfer agent represented by $R^{f4}I_2$ (wherein $R^{f4}$ is a $C_{1-16}$ linear or branched polyfluoroalkylene group).

[9] The method for producing a perfluoroelastomer according to [7] or [8], wherein the radical copolymerization is emulsion polymerization carried out in the presence of an aqueous medium and an emulsifier.

[10] The method for producing a perfluoroelastomer according to [8] or [9], wherein the chain transfer agent is 1,4-diiodoperfluorobutane.

Advantageous Effects of Invention

According to the present invention, it is possible to provide a perfluoroelastomer, which is excellent in low temperature properties, which does not lose value as a rubber and which is free from a decrease of the productivity, a perfluoroelastomer composition, a crosslinked rubber product, and a method for producing a perfluoroelastomer.

DESCRIPTION OF EMBODIMENTS

In this specification, repeating units directly formed by polymerization of a monomer, and units formed by chemical conversion of some or all of substituents in repeating units formed by polymerization of a monomer into other substituents, will be generally referred to as "structural units".

A perfluorooxaalkyl group means a perfluoroalkyl group having at least one etheric oxygen atom between carbon atoms in the perfluoroalkyl group.

Hereinafter, a perfluoroalkyl vinyl ether will be referred to as "PAVE", and a perfluorooxaalkyl vinyl ether will be referred to as "POAVE".

<Perfluoroelastomer>

The perfluoroelastomer of the present invention comprises structural units (a) derived from TFE, structural units (b) derived from PAVE represented by the following formula (1) and structural units (c) derived from POAVE represented by the following formula (2):

$$CF_2=CFOR^{f1} \quad (1)$$

wherein $R^{f1}$ is a $C_{1-10}$ linear or branched perfluoroalkyl group;

$$CF_2=CF(OCF_2CF_2)_n-(OCF_2)_m-OR^{f2} \quad (2)$$

wherein $R^{f2}$ is a $C_{1-4}$ linear or branched perfluoroalkyl group, n is an integer of from 0 to 3, m is an integer of from 0 to 4, and (n+m) is an integer of from 1 to 7.

(Structural Units (a))

The structural units (a) are structural units derived from TFE.

(Structural Units (b))

The structural units (b) are structural units derived from PAVE represented by the following formula (1):

$$CF_2=CFOR^{f1} \quad (1)$$

wherein $R^{f1}$ is a $C_{1-10}$ linear or branched perfluoroalkyl group.

The number of carbon atoms in $R^{f1}$ is preferably from 1 to 5, more preferably from 1 to 3. Within such a range, the productivity of the perfluoroelastomer will improve.

As PAVE, for example, PMVE, perfluoroethyl vinyl ether (hereinafter referred to as "PEVE"), PPVE or perfluorobutyl vinyl ether may be mentioned. Among them, in view of productivity, PMVE, PEVE or PPVE is preferred.

(Structural Units (c))

The structural units (c) are structural units derived from POAVE represented by the following formula (2):

$$CF_2=CF(OCF_2CF_2)_n-(OCF_2)_m-OR^{f2} \quad (2)$$

wherein $R^{f2}$ is a $C_{1-4}$ linear or branched perfluoroalkyl group, n is an integer of from 0 to 3, m is an integer of from 0 to 4, and (n+m) is an integer of from 1 to 7.

$R^{f2}$ is preferably a $C_{1-3}$ linear or branched perfluoroalkyl group.

Further, n and m are preferably such that m=3 or 4 when n=0, m=2 to 4 when n=1, and m=0 when n=2 or 3, more preferably n=1 and m=2 to 4, or n=2 and m=0.

When $R^{f2}$, and n and m are within the above ranges, the low temperature properties of the perfluoroelastomer will be more excellent, and the productivity of the perfluoroelastomer will improve.

As POAVE represented by the formula (2), for example, $CF_2=CFOC\ F_2CF_2OCF_2OCF_2OCF_2OCF_2OCF_3$ (hereinafter referred to as "POAVE1"), $CF_2=CFOC\ F_2CF_2OCF_2OCF_2OCF_3$ (hereinafter referred to as "POAVE2"), $CF_2=CFOC\ F_2CF_2OCF_2OCF_2CF_3$ (hereinafter referred to as "POAVE3"), $CF_2=CFOC\ F_2OCF_3$ or $CF_2=CFOCF_2OCF_2OCF_3$ may be mentioned. Among them, preferred is POAVE1, POAVE2 or POAVE3.

(Contents of Structural Units (a), (b) and (c))

The content of the structural units (a) is preferably from 40 to 70 mol %, more preferably from 50 to 70 mol %, most preferably from 55 to 70 mol % based on the total number of moles of the structural units (a), (b) and (c).

The content of the structural units (b) is preferably from 3 to 57 mol %, more preferably from 5 to 57 mol %, most preferably from 10 to 40 mol % based on the total number of moles of the structural units (a), (b) and (c).

Further, the content of the structural units (c) is preferably from 3 to 57 mol %, more preferably from 5 to 57 mol %, most preferably from 10 to 40 mol % based on the total number of moles of the structural units (a), (b) and (c).

When the contents of the structural units (a), (b) and (c) are within such ranges, the perfluoroelastomer will have more excellent low temperature properties, and will have more excellent heat resistance and chemical resistance.

(Structural Units Derived from Other Monomer)

The perfluoroelastomer of the present invention may have structural units derived from a monomer (hereinafter referred to as "other monomer") other than the structural units derived from TFE, PAVE and POAVE. As the structural units derived from other monomer, for example, the after-mentioned structural units (d) and structural units (e) may be mentioned.

Structural Units (d):

The structural units (d) are structural units derived from a perfluorodivinyl ether (hereinafter referred to as "PDVE") represented by the following formula (3).

$$CF_2=CFOR^{f3}OCF=CF_2 \quad (3)$$

wherein $R^{f3}$ is a $C_{1-25}$ linear or branched perfluoroalkylene group or a perfluorooxaalkylene group.

Among them, preferred are structural units derived from $CF_2=CFO(CF_2)_4OCF=CF_2$.

When the perfluoroelastomer has structural units (d) derived from PDVE represented by the formula (3), it will have more excellent crosslinking properties, heat resistance and chemical resistance.

The content of the structural units (d) is preferably from 0.01 to 5 mol %, more preferably from 0.01 to 2 mol % based on the sum of the numbers of moles of the structural units (a), (b) and (c). When the content of the structural units (d) is within such a range, the perfluoroelastomer will have more excellent heat resistance and chemical resistance.

Structural Units (e):

The structural units derived from other monomer other than the structural units (d) may be structural units (e) derived from a monomer having a fluorine atom and a halogen atom other than fluorine, such as bromotrifluoroethylene or iodotrifluoroethylene; or a monomer having a fluorine atom and a nitrile group such as $CF_2=CFO(CF_2)_5CN$ or perfluoro(8-cyano-5-methyl-3,6-dioxa-1-octene).

The content of the structural units (e) is preferably from 0.01 to 5 mol %, more preferably from 0.01 to 3 mol % based on the sum of the numbers of moles of the structural units (a), (b) and (c). When the content of the structural units (e) is within such a range, the perfluoroelastomer will have more excellent crosslinking properties and will have more excellent heat resistance and chemical resistance.
(Iodine Atom)

The side chains and the terminals of the perfluoroelastomer of the present invention may be bonded to iodine atoms.

The content of iodine atoms is preferably from 0.01 to 1.5 mass %, more preferably from 0.01 to 1.0 mass % in the perfluoroelastomer. Within such a range, the perfluoroelastomer will have excellent crosslinking properties, and the obtainable crosslinked rubber product will be excellent in heat resistance and chemical resistance.
<Method for Producing Perfluoroelastomer>

The perfluoroelastomer of the present invention is obtained by copolymerizing TFE, PAVE and POAVE, and as the case requires, other monomer.

The polymerization method is preferably a radical polymerization method.

As the radical polymerization initiation source, for example, a radical polymerization initiator, a redox polymerization initiator, heating or irradiation with ionizing radiation may be mentioned. Among them, preferred is a radical polymerization initiator in view of excellent productivity of the perfluoroelastomer.
(Radical Polymerization Initiator)

As the radical polymerization initiator, a known initiator may be properly used.

The radical polymerization initiator is specifically preferably a water-soluble initiator, and it may, for example, be specifically a persulfate such as ammonium persulfate, sodium persulfate or potassium persulfate; hydrogen peroxide; a water-soluble organic peroxide such as disuccinic peroxide, diglutaric peroxide or tert-butyl hydroperoxide; or an organic initiator such as azobisisobutylamidine dihydrochloride. Further, a redox initiator comprising a combination of a persulfate or hydrogen peroxide with a reducing agent such as sodium hydrogen sulfite or sodium thiosulfate; or an inorganic initiator of a system in which a small amount of iron, a ferrous salt, silver sulfate or the like further coexists, may be mentioned.

Particularly as a radical polymerization initiator used in the after-mentioned emulsion polymerization, a water-soluble initiator is preferred.

The amount of the radical polymerization initiator used is preferably from 0.0001 to 5 mass %, more preferably from 0.001 to 2 mass % based on the mass of the formed perfluoroelastomer.
(Chain Transfer Agent)

In a case where a radical polymerization initiator is used to initiate polymerization, the polymerization is carried out preferably in the presence of a chain transfer agent.

As the chain transfer agent, for example, an alcohol such as methanol or ethanol; a chlorofluorohydrocarbon such as 1,3-dichloro-1,1,2,2,3-pentafluoropropane or 1,1-dichloro-1-fluoroethane, a hydrocarbon such as pentane, hexane or cyclohexane; $R^{fA}I_2$ (wherein $R^{fA}$ is a $C_{1-16}$ linear or branched polyfluoroalkylene group); $R^{fA}IBr$ (wherein $R^{fA}$ is as defined for $R^{fA}$ in the above $R^{fA}I_2$), or a mercaptan such as tert-dodecylmercaptan or n-octadecylmercaptan may be mentioned.

Among them, $R^{fA}I_2$ is preferred, whereby the obtainable perfluoroelastomer will be excellent in crosslinking properties and the obtainable crosslinked rubber product will be excellent in physical properties. $R^{fA}$ is more preferably a perfluoroalkylene group.

As $R^{fA}I_2$, for example, 1,4-diiodoperfluorobutane, 1,6-diiodoperfluorohexane or 1,8-diiodoperfluorooctane may be mentioned. Among them, preferred is 1,4-diiodoperfluorobutane in view of excellent polymerizability.

The amount of the chain transfer agent used is properly set depending upon the chain transfer constant of the chain transfer agent to be used.

For example, in a case where $R^{fA}I_2$ is used, the amount is preferably from 0.01 to 5 mass %, more preferably from 0.05 to 2 mass % based on the mass of the perfluoroelastomer formed.
(Polymerization Method)

As the polymerization method, for example, emulsion polymerization, solution polymerization, suspension polymerization or bulk polymerization may be mentioned. Among them, preferred is emulsion polymerization in view of excellent adjustability of the molecular weight and the copolymer composition, and productivity.
Emulsion Polymerization:

Emulsion polymerization is carried out in the presence of an aqueous medium and an emulsifier.

As the aqueous medium, for example, water or a mixture of water and a water-soluble organic solvent may be mentioned.

As the water-soluble organic solvent, for example, tert-butanol, propylene glycol, dipropylene glycol, dipropylene glycol monomethyl ether or tripropylene glycol may be mentioned. Among them, preferred is tert-butanol or dipropylene glycol monomethyl ether, whereby the polymerization rate of the monomer will not decrease.

When the aqueous medium contains a water-soluble organic solvent, excellent dispersibility of the monomer and excellent dispersibility of the formed perfluoroelastomer will be achieved, and excellent productivity of the perfluoroelastomer will be achieved.

The content of the water-soluble organic solvent is preferably from 1 to 40 parts by mass, more preferably from 3 to 30 parts by mass per 100 parts by mass of water.

As the emulsifier, a known emulsifier may be properly used.

As the emulsifier, for example, an anionic emulsifier, a nonionic emulsifier or a cationic emulsifier may be mentioned. Among them, preferred is an anionic emulsifier, in view of excellent mechanical and chemical stability of the latex.

As the anionic emulsifier, for example, a hydrocarbon emulsifier such as sodium lauryl sulfate or sodium dodecylbenzenesulfonate; or a fluorinated emulsifier such as ammonium perfluorooctanoate, sodium perfluorooctanoate, ammonium perfluorohexanoate or a compound represented by the formula $F(CF_2)_nO(CF(X)CF_2O)_mCF(Y)COOA$ (wherein each of X and Y which are independent of each other, is a fluorine atom or a $C_{1-3}$ linear or branched perfluoroalkyl group, A is a hydrogen atom, an alkali metal or $NH_4$, n is an integer of from 2 to 10 and m is an integer of 0 or from 1 to 3) may be mentioned.

As the compound represented by $F(CF_2)_nO(CF(X)CF_2O)_mCF(Y)COOA$, for example, $C_2F_5OCF_2CF_2OCF_2COONH_4$, $F(CF_2)_3O(CF(CF_3)CF_2O)_2CF(CF_3)COONH_4$, $F(CF_2)_3OCF_2CF_2OCF_2COONH_4$, $F(CF_2)_3O(CF_2CF_2O)_2CF_2COONH_4$, $F(CF_2)_4OCF_2CF_2OCF_2COONH_4$, $F(CF_2)_4O(CF_2CF_2O)_2CF_2COONH_4$, $F(CF_2)_3OCF_2CF_2OCF_2COONa$, $F(CF_2)_3O(CF_2CF_2O)_2CF_2COONa$, $F(CF_2)_4OCF_2CF_2OCF_2COONa$, $F(CF_2)_4O(CF_2CF_2O)_2CF_2COONa$, $F(CF_2)_2OCF_2CF_2OCF_2COONH_4$, $F(CF_2)_2O(CF_2CF_2O)_2CF_2COONH_4$, $F(CF_2)_2OCF_2CF_2OCF_2COONa$ or $F(CF_2)_2O(CF_2CF_2O)_2CF_2COONa$ may be mentioned.

Among them, preferred is ammonium perfluorooctanoate, $C_2F_5OCF_2CF_2OCF_2COONH_4$, $F(CF_2OCF_2CF_2OCF_2COONH_4$ or $F(CF_2)_3OCF_2 CF_2OCF_2COONH_4$.

The amount of the emulsifier used is preferably from 0.01 to 15 parts by mass, more preferably from 0.1 to 10 parts by mass per 100 parts by mass of the aqueous medium.

When emulsion polymerization is employed as the polymerization method, a latex containing the perfluoroelastomer is obtained. The perfluoroelastomer is separated from the latex by coagulation.

As the coagulation method, addition of a metal salt, addition of an inorganic acid such as hydrochloric acid, mechanical shearing or freezing and defrosting may, for example, be mentioned.

(Polymerization Conditions)

The polymerization conditions for radical polymerization may be properly selected depending upon the monomer composition and the decomposition temperature of the radical polymerization initiator.

The polymerization pressure is preferably from 0.1 to 20 MPaG, more preferably from 0.3 to 10 MPaG, most preferably from 0.3 to 5 MPaG.

The polymerization temperature is preferably from 0 to 100° C., more preferably from 10 to 90° C., most preferably from 20 to 80° C.

The polymerization time is preferably from 1 to 72 hours, more preferably from 1 to 24 hours, most preferably from 1 to 12 hours.

<Perfluoroelastomer Composition>

The perfluoroelastomer composition of the present invention comprises the above perfluoroelastomer and a crosslinking agent. Further, the perfluoroelastomer composition may contain a crosslinking aid or another compounding agent.

(Crosslinking Agent)

As the crosslinking agent, for example, an organic peroxide, a polyol, an amine or a triazine may be mentioned. Among them, preferred is an organic peroxide in view of excellent productivity, heat resistance and chemical resistance of the obtainable crosslinked rubber product.

As the organic peroxide, for example, a dialkylperoxide such as di-tert-butyl peroxide, tert-butyl cumyl peroxide, dicumyl peroxide, α,α-bis(tert-butylperoxy)-p-diisopropylbenzene, 2,5-dimethyl-2,5-di(tert-butylperoxy)hexane, 2,5-dimethyl-2,5-di(tert-butylperoxy)hexane-3,1,1-di(tert-butylperoxy)-3,3,5-trimethylcyclohexane, 2,5-dimethylhexane-2,5-dihydroperoxide, benzoyl peroxide, tert-butyl peroxybenzene, 1,3-bis(tert-butylperoxyisopropyl)benzene, 2,5-dimethyl-2,5-di(benzoylperoxy)hexane, tert-butyl peroxymaleic acid or tert-butyl peroxyisopropylcarbonate may be mentioned. Among them, preferred is a dialkylperoxide.

The amount of the crosslinking agent blended is preferably from 0.3 to 10 parts by mass, more preferably from 0.3 to 5 parts by mass, most preferably from 0.5 to 3 parts by mass per 100 parts by mass of the perfluoroelastomer. Within such a range, crosslinking properties with excellent balance between strength and elongation will be obtained.

(Crosslinking Aid)

The perfluoroelastomer composition preferably further contains a crosslinking aid in addition to the crosslinking agent. When a crosslinking aid is blended, a higher crosslinking efficiency will be obtained.

As the crosslinking aid, for example, triallyl cyanurate, triallyl isocyanurate, trimethallyl isocyanurate, 1,3,5-triacryloylhexahydro-1,3,5-triazine, triallyl trimellitate, m-phenylenediamine bismaleimide, p-quinone dioxime, p,p'-dibenzoylquinone dioxime, dipropargyl terephthalate, diallyl phthalate, N,N',N'',N'''-tetraallylterephthalamide or a vinyl group-containing siloxane oligomer (such as polymethylvinylsiloxane or polymethylphenylvinylsiloxane) may be mentioned. Among them, preferred is triallyl cyanurate, triallyl isocyanurate or trimethallyl isocyanurate, more preferred is triallyl isocyanurate.

The amount of the crosslinking aid blended is preferably from 0.1 to 10 parts by mass, more preferably from 0.5 to 5 parts by mass per 100 parts by mass of the perfluoroelastomer. Within such a range, crosslinking properties with excellent balance between strength and elongation will be obtained.

(Other Compounding Agent)

The perfluoroelastomer composition may contain a metal oxide as the case requires. When a metal oxide is blended, the crosslinking reaction will quickly and securely proceed.

As the metal oxide, for example, an oxide of a bivalent metal such as magnesium oxide, calcium oxide, zinc oxide or lead oxide may be mentioned.

The amount of the metal oxide blended is preferably from 0.1 to 10 parts by mass, more preferably from 0.5 to 5 parts by mass per 100 parts by mass of the perfluoroelastomer. Within such a range, crosslinking properties with excellent balance between strength and elongation will be obtained.

The perfluoroelastomer composition may contain a pigment for coloring, a filler, a reinforcing material or the like.

As the filler or the reinforcing material, for example, carbon black, titanium oxide, silicon dioxide, clay, talc, polytetrafluoroethylene, polyvinylidene fluoride, polyvinyl fluoride, polychlorotrifluoroethylene, a tetrafluoroethylene/ethylene copolymer, a tetrafluoroethylene/propylene copolymer or a tetrafluoroethylene/vinylidene fluoride copolymer may be mentioned.

(Method for Producing Perfluoroelastomer Composition)

The perfluoroelastomer composition of the present invention may be obtained by kneading the above perfluoroelastomer and the crosslinking agent and as the case requires, the crosslinking aid and other compounding agents by a kneading method using a known kneading apparatus such as a twin roll, a kneader or a Banbury mixer.

<Crosslinked Rubber Product>

The crosslinked rubber product of the present invention is obtained by crosslinking the above perfluoroelastomer or perfluoroelastomer composition.

The crosslinked rubber product may, for example, be a crosslinked rubber sheet, an O-ring, a sheet gasket, an oil seal, a diaphragm, a V-ring, a sealing material for a semiconductor device, a chemical resistant sealing material, a coating composition or an electric wire-covering material.

As the physical properties of the crosslinked rubber product of the present invention, the tensile strength is preferably from 2 to 14 MPa, more preferably from 6 to 9 MPa. Further, the elongation at break is preferably from 300 to 500%, more preferably from 350 to 450%. The glass transition point is preferably from −30 to 0° C., more preferably from −25 to −10° C.

(Method for Producing Crosslinked Rubber Product)

The crosslinked rubber product of the present invention is obtained by properly forming the perfluoroelastomer composition and crosslinking it by a known method.

The crosslinking method is preferably e.g. a method by heating or a method by irradiation with ionizing radiation.

As the forming method, for example, injection molding, extrusion, co-extrusion, blow molding, compression molding, inflation molding, transfer molding or calendar molding may be mentioned.

In a case where the perfluoroelastomer composition contains an organic peroxide as the crosslinking agent, crosslinking by heating is preferred.

As a specific method for producing a crosslinked rubber product by crosslinking by heating, for example, a hot press molding method may be mentioned. By the hot press molding method, the perfluoroelastomer composition is filled in a cavity of a heated mold having a desired shape and heated to mold and at the same time to crosslink (sometimes referred to as hot press crosslinking) the perfluoroelastomer composition thereby to obtain a crosslinked rubber product. The heating temperature is preferably from 130 to 220° C., more preferably from 140 to 200° C., most preferably from 150 to 180° C.

Further, in the case of using the hot press molding method, the crosslinked rubber product obtained by hot press crosslinking (sometimes referred to as primary crosslinking) is preferably further heated e.g. by an oven using electricity, hot air, vapor or the like as a heat source to allow crosslinking proceed (sometimes referred to as secondary crosslinking). The temperature at the time of secondary crosslinking is preferably from 150 to 280° C., more preferably from 180° C. to 260° C., most preferably from 200 to 250° C. The secondary crosslinking time is preferably from 1 to 48 hours, more preferably from 4 to 24 hours. By sufficient secondary crosslinking, the crosslinked rubber properties of the crosslinked rubber product will improve. Further, the residue of the peroxide contained in the crosslinked rubber product is decreased by decomposition and volatilization. The hot press molding method is preferably applied to forming of e.g. a sealing material.

As the ionizing radiation in the method by irradiation with ionizing radiation, for example, electron beam or γ rays may be mentioned. In the case of crosslinking by irradiation with ionizing radiation, preferred is a method of preliminarily forming the perfluoroelastomer or the perfluoroelastomer composition to a desired shape and crosslinking it by irradiation with ionizing radiation. As the forming method, a method of applying a suspension or solution having the perfluoroelastomer or the perfluoroelastomer composition dispersed or dissolved in a proper solvent, and drying it to form a coating film, or a method of extruding the perfluoroelastomer or the perfluoroelastomer composition to form it into a hose or an electric wire may, for example, be mentioned. The irradiation dose of ionizing radiation is properly set. It is preferably from 1 to 300 kGy, more preferably from 10 to 200 kGy.

Functions and Effects by the Present Invention

The above-described perfluoroelastomer of the present invention has a low glass transition point since it comprises the structural units (a), (b) and (c) in combination. Accordingly, according to the present invention, functions and effects such as excellent low temperature properties are achieved. The functions and effects are not sufficiently clearly understood, but are considered to be because of ether linkages present at constant intervals in the perfluorooxaalkyl group of the above formula (2) in the structural units (c).

Further, of the perfluoroelastomer of the present invention, a decrease in properties such as tensile strength and elongation at break which occurs when the structural units (c) are not contained and the content of the structural units (b) or the like is high, is suppressed, and accordingly the crosslinked rubber product obtainable from the perfluoroelastomer of the present invention does not lose value as a rubber.

Further, the polymerization rate will not be lowered when TFE, PAVE represented by the above formula (1) and POAVE represented by the above formula (2) are used in combination as materials, and therefore according to the present invention, the perfluoroelastomer can be produced without lowering the productivity.

EXAMPLES

Now, the present invention will be described in further detail with reference to Examples. However, it should be understood that the present invention is by no means restricted to such specific Examples.

Evaluation Method

Calculation of the molar ratio of the structural units (a), (b) and (c) (hereinafter referred to as "(a):(b):(c)") in the perfluoroelastomer, measurement of physical properties of the crosslinked rubber product and determination of the glass transition temperature of the perfluoroelastomer were carried out by the following methods. ((a):(b):(c))

By a conventional analysis method employing IR method, NMR method or the like, the mass of the structural units derived from PAVE and the mass of the structural units derived from POAVE contained in the perfluoroelastomer could not be separately measured. Thus, the contents of the respective structural units in the perfluoroelastomer were calculated by the following method.

The mass (C) of the structural units derived from POAVE in the perfluoroelastomer was obtained by subtracting the mass of unreacted POAVE recovered after polymerization from the mass of POAVE added. The mass of unreacted POAVE recovered after polymerization was measured by an analytical balance (manufactured by Mettler-Toledo International Inc., ML204).

The above (C) was subtracted from the mass of the obtained perfluoroelastomer to obtain the total mass (A+B) of the mass (A) of the structural units derived from TFE and the mass (B) of the structural units derived from PAVE in the perfluoroelastomer.

(A+B) agreed with the total mass of TFE and PAVE injected along with progress of polymerization after initiation of polymerization. This means that the mass ratio (A:B:C) of the structural units in the perfluoroelastomer is equal to "the mass of TFE injected after initiation of polymerization:the mass of PAVE injected after initiation of polymerization:(C)".

Accordingly, "(a):(b):(c)" was obtained from "the mass of TFE injected after initiation of polymerization:the mass of PAVE injected after initiation of polymerization:C" by calculation using molecular weights of the respective structural units.

(Physical Properties of Crosslinked Rubber Product)

100 parts by mass of the perfluoroelastomer, 10 parts by mass of carbon black, 5 parts by mass of triallyl isocyanurate, 1 part by mass of 2,5-dimethyl-2,5-di(tert-butylperoxy) hexane (manufactured by NOF CORPORATION, PER-HEXA 25B) and 3 parts by mass of magnesium oxide were kneaded by a twin roll to obtain a perfluoroelastomer composition.

The perfluoroelastomer composition was hot-pressed at 150° C. for 20 minutes and then subjected to secondary crosslinking in an oven at 250° C. for 4 hours to obtain a crosslinked rubber sheet having a thickness of 2 mm.

A sample was punched out from the obtained crosslinked rubber sheet by a No. 3 dumbbell, and the tensile strength and the elongation at break were measured in accordance with JIS K6251.

(Glass Transition Temperature)

The thermal expansion coefficient of the perfluoroelastomer composition was measured at a temperature-raising rate of 1° C./min under a load of 5 g using a thermal analysis equipment (manufactured by Seiko Instruments Inc. TMA6100). The inflection point of the thermal expansion coefficient was taken as the glass transition temperature (° C.).

Example 1

A stainless steel pressure-resistant reactor having an internal capacity of 2,100 mL equipped with an anchor blade was deaerated, and 900 g of deionized water, 60 g of a 30% solution of $C_2F_5OCF_2CF_2OCF_2COONF_{14}$, 123 g of POAVE1, 1.6 g of disodium hydrogen phosphate dodecahydrate and 0.57 g of 1,4-diiodoperfluorobutane were charged, and the vapor phase was replaced with nitrogen. While the content was stirred at a rate of 600 rpm by the anchor blade, when the internal temperature reached 80° C., 15 g of TFE and 38 g of PMVE were injected into the reactor. The internal pressure of the reactor was 0.5 MPa. 5 mL of a 2.5 mass % aqueous ammonium persulfate solution was added to initiate polymerization.

The addition ratio of monomers injected before initiation of polymerization (hereinafter referred to as "initial monomers") as represented by molar ratio is TFE:PMVE:POAVE1=25:38:37 (Table 1).

At a point when the internal pressure of the reactor decreased to 0.45 MPa along with progress of the polymerization, TFE was injected to increase the internal pressure of the reactor to 0.5 MPa. This operation was repeatedly carried out, and 7.5 g of POAVE1 was injected every time 8 g of TFE was injected. Further, 7 g of PMVE was injected every time 16 g of TFE was injected.

At a point when the total amount of TFE added reached 64 g, addition of the monomers to be injected after initiation of the polymerization (hereinafter referred to as "added monomers") was terminated, the internal temperature of the reactor was decreased to 10° C. to terminate the polymerization reaction, and a latex containing a perfluoroelastomer was obtained.

Further, the polymerization time was 4.5 hours.

The total mass of the added monomers was such that the mass of TFE was 64 g, the mass of PMVE was 28 g and the mass of POAVE1 was 90 g, and the masses correspond to TFE:PMVE:POAVE1=66:17:17 as calculated as molar ratio (Table 1).

The latex was added to a 5 mass % aqueous potassium aluminum sulfate solution to coagulate and separate the perfluoroelastomer. The perfluoroelastomer was collected by filtration, washed with ultrapure water and vacuum dried at 50° C. to obtain 154 g of a white perfluoroelastomer.

Example 2

232 g of a white perfluoroelastomer was obtained in the same manner as in Example 1 except that POAVE2 was used instead of POAVE1 and the addition ratio (molar ratio) of the initial monomers and the added monomers was changed as identified in Table 1.

The polymerization time was 4.4 hours.

Example 3

132 g of a white perfluoroelastomer was obtained in the same manner as in Example 1 except that POAVE3 was used instead of POAVE1 and the addition ratio (molar ratio) of the initial monomers and the added monomers was changed as identified in Table 1.

The polymerization time was 4.4 hours.

Example 4

160 g of a white perfluoroelastomer was obtained in the same manner as in Example 1 except that POAVE3 was used instead of POAVE1 and the addition ratio (molar ratio) of the initial monomers and the added monomers was changed as identified in Table 1.

The polymerization time was 4.5 hours.

Comparative Example 1

224 g of a white perfluoroelastomer was obtained in the same manner as in Example 1 except that $CF_2=CFOCF_2CF_2CF_2OCF_3$ (hereinafter referred to as "POAVE4") was used instead of POAVE1 and the addition ratio (molar ratio) of the initial monomers and the added monomers was changed as identified in Table 1.

The polymerization time was 4.4 hours.

Comparative Example 2

A stainless steel pressure-resistant reactor having an internal capacity of 2,100 mL equipped with an anchor blade was deaerated, 900 g of deionized water, 60 g of a 30% solution of $C_2F_5OCF_2CF_2OCF_2COONH_4$, 1.6 g of disodium hydrogen phosphate dodecahydrate and 0.57 g of 1,4-diiodoperfluorobutane were charged, and the vapor phase was replaced with nitrogen. While the content was stirred at a rate of 600 rpm by the anchor blade, when the internal temperature reached 80° C., 11 g of TFE and 53 g of PMVE were injected into the reactor. The internal pressure of the reactor was 0.5 MPa. 5 mL of a 2.5 mass % aqueous ammonium persulfate solution was added to initiate polymerization.

The addition ratio of the initial monomers as represented by molar ratio is TFE:PMVE=26:74 (Table 1).

At a point when the internal pressure of the reactor decreased to 0.45 MPa along with progress of the polymerization, TFE was injected to increase the internal pressure of the reactor to 0.5 MPa. This operation was repeatedly carried out, and 7 g of PMVE was injected every time 8 g of TFE was injected. At a point when the total amount of TFE added reached 64 g, addition of the added monomers was terminated, the internal pressure of the reactor was decreased to 10° C. to terminate the polymerization reaction, and a latex containing a perfluoroelastomer was obtained.

The polymerization time was 6.5 hours.

The total amount of the added monomers was such that the mass of TFE was 100 g and the mass of PMVE was 85 g, and the masses correspond to TFE:PMVE=66:34 as calculated as molar ratio (Table 1).

The subsequent operation was carried out in the same manner as in Example 1 to Obtain 185 g of a white perfluoroelastomer.

The types of the monomers used and their addition ratio, and the evaluation results in Examples 1 to 4 and Comparative Example 1 and 2 are shown in Table 1.

TABLE 1

|  | Example 1 | Example 2 | Example 3 | Example 4 | Comparative Example 1 | Comparative Example 2 |
|---|---|---|---|---|---|---|
| Monomer forming structural units (a) | | | | TFE | | |
| Monomer forming structural units (b) | | | | PMVE | | |
| Monomer forming structural units (c) | POAVE1 | POAVE2 | POAVE3 | POAVE3 | POAVE4 | — |
| Addition ratio of initial monomers (TFE:PMVE:POAVE) (molar ratio) | | | 25:38:37 | | | 26:74:0 |
| Addition ratio of added monomers (TFE:PMVE:POAVE) (molar ratio) | 66:17:17 | 66:17:17 | 47:12:41 | 61:16:23 | 66:17:17 | 66:34:0 |
| Ratio of structural units (a), (b) and (c) in perfluoroelastomer ((a):(b):(c)) (molar ratio) | 69:18:13 | 56:15:29 | 70:19:11 | 62:16:21 | 52:17:32 | 66:34:0 |
| Tensile strength (MPa) | 8.3 | 8.0 | 7.6 | 8.0 | — | 21 |
| Elongation at break (%) | 384 | 394 | 421 | 402 | — | 210 |
| Glass transition temperature (° C.) | −20 | −18 | −16 | −13 | — | 5 |

From the above results, the perfluoroelastomer in Comparative Example 1 having structural units derived from POAVE4 which does not belong to POAVE represented by the formula (2) was in a gel form, and its tensile strength, elongation at break and glass transition temperature could not be measured.

Further, the perfluoroelastomers in Example 1 to 4 having structural units (c) derived from POAVE1 to 3 belonging to POAVE represented by the formula (2) had a low tensile strength, a high elongation at break and a low glass transition temperature as compared with Comparative Example 2 in which no structural units (c) were contained.

INDUSTRIAL APPLICABILITY

The perfluoroelastomer of the present invention can be used for a conventional rubber product, and since it is excellent in low temperature properties, it is particularly suitable for an O-ring, a sheet gasket, an oil seal, a diaphragm, a V-ring and the like which are used in low temperature environment. Further, it can be suitably used also as a sealing material for a semiconductor device, a chemical resistant sealing material, a coating composition, an electric wire covering material and the like.

This application is a continuation of PCT Application No. PCT/JP2014/080680, filed on Nov. 19, 2014, which is based upon and claims the benefit of priority from Japanese Patent Application No. 2013-243731 filed on Nov. 26, 2013. The contents of those applications are incorporated herein by reference in their entireties.

What is claimed is:

1. A perfluoroelastomer comprising structural units (a) derived from tetrafluoroethylene, a structural unit (b) derived from a perfluoroalkyl vinyl ether represented by a formula (1) wherein the structural unit (b) consists of one type of structural unit, and structural units (c) derived from a perfluorooxaalkyl vinyl ether represented by a formula (2):

$$CF_2=CFOR^{f1} \quad (1)$$

wherein $R^{f1}$ is a $C_{1-10}$ linear or branched perfluoroalkyl group;

$$CF_2=CF(OCF_2CF_2)_n-(OCF_2)_m-OR^{f2} \quad (2)$$

wherein $R^{f2}$ is a $C_{1-4}$ linear or branched perfluoroalkyl group, n is an integer of from 0 to 3, m is an integer of from 0 to 4, and (n+m) is an integer of from 1 to 7, wherein a content of the structural units (a) is from 40 to 70 mol %, a content of the structural unit (b) is from 16 to 40 mol %, and a content of the structural units (c) is from 3 to 57 mol % based on a total number of moles of the structural units (a), (b) and (c) and the total mol % of structural units (a)+(b)+(c) is at least 98 mol % based on the total number of moles of all the structural units in the perfluoroelastomer.

2. The perfluoroelastomer according to claim 1, wherein in the formula (2), $R^{f2}$ is a $C_{1-3}$ linear or branched perfluoroalkyl group, and m=3 or 4 when n=0, m=2 to 4 when n=1, and m=0 when n=2 or 3.

3. The perfluoroelastomer according to claim 1, wherein the perfluorooxaalkyl vinyl ether represented by the formula (2) is at least one member selected from the group consisting of $CF_2=CFOF_2CF_2OCF_2OCF_2OCF_2OCF_3$,
$CF_2=CFOCF_2CF_2OCF_2OCF_2OCF_3$ and
$CF_2=CFOCF_2CF_2OCF_2CF_2OCF_2CF_3$.

4. A perfluoroelastomer composition comprising the perfluoroelastomer of claim 1 and a crosslinking agent.

5. A crosslinked rubber product obtained by crosslinking the perfluoroelastomer of claim 1.

6. A method for producing a perfluoroelastomer, which comprises radical copolymerizing tetrafluoroethylene, a perfluoroalkyl vinyl ether represented by a formula (1) and a perfluorooxaalkyl vinyl ether represented by a formula (2) as materials in the presence of a radical polymerization initiator to form a perfluoroelastomer comprising structural units (a), (b) and (c):

$$CF_2=CFOR^{f1} \quad (1)$$

wherein $R^{f1}$ is a $C_{1-10}$ linear or branched perfluoroalkyl group, $$CF_2=CF(OCF_2CF_2)_n-(OCF_2)_m-OR^{f2} \quad (2)$$

wherein $R^{f2}$ is a $C_{1-4}$ linear or branched perfluoroalkyl group, n is an integer of from 0 to 3, m is an integer of from 0 to 4, and (n+m) is an integer of from 1 to 7, wherein the perfluoroelastomer a content of the structural units (a) is from 40 to 70 mol %, a content of the structural unit (b) is from 16 to 40 mol % and the structural unit (b) consists of one structural unit, and a content of the structural units (c) is from 3 to 57 mol % based on a total number of moles of the structural units (a), (b) and (c) and the total mol % of structural units (a)+(b)+(c) is at least 98 mol % based on the total number of moles of all the structural units in the perfluoroelastomer.

7. The method according to claim 6, wherein the radical copolymerization is carried out in the presence of a chain transfer agent represented by $R^{f2}$ wherein $R^{f4}$ is a $C_{1-6}$ linear or branched polyfluoroalkylene group.

8. The method according to claim 6, wherein the radical copolymerization is an emulsion polymerization carried out in the presence of an aqueous medium and an emulsifier.

9. The method according to claim 7, wherein the chain transfer agent is 1,4-diiodoperfluorobutane.

10. The perfluoroelastomer according to claim 1, wherein a content of the structural unit (b) is from 18 to 40 mol %.

11. The perfluoroelastomer according to claim 1, wherein a content of the structural unit (b) is from 19 to 40 mol %.

12. The perfluoroelastomer of claim 1, wherein the terminals of the perfluoroelastomer comprise iodine.

13. The perfluoroelastomer of claim 1, wherein the perfluoroelastomer has a main chain consisting of the structural units (a), the structural unit (b), and the structural units (c), and chain transfer reagent residue terminals comprising iodine.

14. The perfluoroelastomer of claim 13, wherein the perfluoroelastomer comprises iodine in an amount of from 0.01 to 1.5 mass % based on the mass of the perfluoroelastomer.

15. The method according to claim 6, wherein the perfluorooxaalkyl vinyl ether represented by the formula (2) is at least one member selected from the group consisting of $CF_2$=$CFOCF_2CF_2OCF_2OCF_2OCF_2OCF_3$,
$CF_2$=$CFOCF_2CF_2OCF_2OCF_2OCF_3$ and
$CF_2$=$CFOCF_2CF_2OCF_2CF_2OCF_2CF_3$.

16. The method according to claim 6, wherein the radical copolymerization is carried out in the presence of diiodoperfluorobutane.

17. The method according to claim 6, wherein a content of the structural unit (b) in the perfluoroelastomer is from 18 to 40 mol %.

18. The method according to claim 6, wherein a content of the structural unit (b) in the perfluoroelastomer is from 19 to 40 mol %.

19. The method according to claim 6, wherein the terminals of the perfluoroelastomer comprise iodine.

20. The method according to claim 6, wherein the perfluoroelastomer has a main chain consisting of the structural units (a), the structural unit (b), the structural units (c), and chain transfer reagent residue terminals comprising iodine.

21. The method according to claim 20, wherein the perfluoroelastomer comprises iodine in an amount of from 0.01 to 1.5 mass % based on the mass of the perfluoroelastomer.

22. The perfluoroelastomer of claim 1, wherein the structural unit (b) is perfluoro(methyl vinyl ether).

23. The method according to claim 6, wherein the structural unit (b) is perfluoro(methyl vinyl ether).

* * * * *